US009546738B2

United States Patent
Cardia et al.

(10) Patent No.: US 9,546,738 B2
(45) Date of Patent: *Jan. 17, 2017

(54) AIR VALVE SEAT

(71) Applicant: Mueller International, LLC, Atlanta, GA (US)

(72) Inventors: Sean A. Cardia, Wheaton, IL (US); Timothy Q. Fallon, Geneva, IL (US)

(73) Assignee: Mueller International, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/926,060

(22) Filed: Oct. 29, 2015

(65) Prior Publication Data

US 2016/0047477 A1    Feb. 18, 2016

Related U.S. Application Data

(63) Continuation of application No. 13/752,414, filed on Jan. 29, 2013, now Pat. No. 9,200,718.

(51) Int. Cl.
| | |
|---|---|
| *F16K 31/18* | (2006.01) |
| *F16K 24/04* | (2006.01) |
| *F16K 1/42* | (2006.01) |
| *F16K 25/00* | (2006.01) |

(52) U.S. Cl.
CPC .......... *F16K 24/044* (2013.01); *F16K 1/427* (2013.01); *F16K 25/005* (2013.01); *F16K 31/18* (2013.01); *Y10T 137/0324* (2015.04); *Y10T 137/3099* (2015.04)

(58) Field of Classification Search
CPC ........ F16K 1/427; F16K 24/044; F16K 31/18; F16K 25/005; Y10T 137/0324; Y10T 137/3099

USPC ........ 137/409, 429, 433, 430; 251/395, 360, 251/361, 363
See application file for complete search history.

(56) References Cited

U.S. PATENT DOCUMENTS

| | | | |
|---|---|---|---|
| 1,119,979 | A | 12/1914 | Mulligan |
| 1,540,380 | A | 6/1925 | Wilson |
| 1,720,486 | A | 9/1929 | Leipert |
| 1,731,404 | A | 10/1929 | Veazey |

(Continued)

FOREIGN PATENT DOCUMENTS

| | | |
|---|---|---|
| DE | 814977 | 9/1951 |
| SU | 1270471 | 11/1986 |

OTHER PUBLICATIONS

Cardia, Sean A.; Final Office Action for U.S. Appl. No. 13/752,414, filed Jan. 29, 2013, mailed Apr. 1, 2015, 8 pgs.

(Continued)

*Primary Examiner* — Umashankar Venkatesan
(74) *Attorney, Agent, or Firm* — Taylor English Duma LLP

(57) ABSTRACT

An air valve includes a valve body having an inner surface and an outer surface, the inner surface and the outer surface defining an inlet and an outlet; a seat mounted within the valve body and having an upper surface and a lower surface, the upper surface facing the outlet of the valve body, the upper surface and the lower surface defining a bore and a fastener hole, the bore and the fastener hole extending between the upper surface and the lower surface, the upper surface further defining a first sealing ridge and a second sealing ridge, a second sealing ridge, the first sealing ridge and the second sealing ridge extending between the bore and the fastener hole; a fastener extending through the fastener hole into the valve body; and a float moveable within the valve body and engageable with the bore of the seat.

15 Claims, 10 Drawing Sheets

(56) References Cited

U.S. PATENT DOCUMENTS

| | | |
|---|---|---|
| 1,936,537 A | 11/1933 | Borden |
| 1,969,795 A | 8/1934 | Hewitt |
| 2,138,903 A | 12/1938 | Bradford |
| 2,307,440 A | 1/1943 | Wilson |
| 2,383,570 A | 8/1945 | Sellew |
| 2,425,070 A | 8/1947 | Nicolette |
| 2,481,460 A | 9/1949 | Wiliams |
| 2,610,870 A | 9/1952 | Parmesan |
| 2,645,449 A | 7/1953 | Gulick |
| 3,152,604 A | 10/1964 | Frye et al. |
| 3,471,123 A | 10/1969 | Carlson et al. |
| 3,599,659 A | 8/1971 | Nuter et al. |
| 3,675,896 A | 7/1972 | Mercier |
| 3,727,635 A | 4/1973 | Todd |
| 3,834,415 A | 9/1974 | Herron |
| 3,967,808 A | 7/1976 | Lieding |
| 4,079,751 A | 3/1978 | Partridge et al. |
| 4,104,004 A | 8/1978 | Graef |
| 4,197,875 A | 4/1980 | Schieferstein et al. |
| 4,230,142 A | 10/1980 | Saarem et al. |
| 4,243,066 A | 1/1981 | Lambie |
| 4,313,459 A | 2/1982 | Mylander |
| 4,519,583 A | 5/1985 | Lapinoja |
| 4,519,614 A | 5/1985 | Garner |
| 4,586,528 A | 5/1986 | Andres et al. |
| 4,611,788 A | 9/1986 | Thomsen |
| 4,730,638 A | 3/1988 | Hazelton |
| 4,934,715 A | 6/1990 | Johnson |
| 5,031,655 A | 7/1991 | Hebaus |
| 5,090,439 A | 2/1992 | Sabalvaro, III et al. |
| 5,322,330 A | 6/1994 | Remsburg |
| 5,386,844 A | 2/1995 | Kennedy |
| 5,522,415 A | 6/1996 | Hopenfeld |
| 5,613,513 A | 3/1997 | Makowan |
| 5,660,214 A | 8/1997 | Pettesch |
| 5,769,429 A | 6/1998 | Smetters et al. |
| 5,809,976 A | 9/1998 | Cook et al. |
| 5,823,259 A | 10/1998 | Royle |
| 5,894,858 A | 4/1999 | Schlusselbauer |
| 5,988,201 A | 11/1999 | Lebkuchner et al. |
| 6,158,456 A | 12/2000 | Enge |
| 6,244,829 B1 | 6/2001 | Yumoto |
| 6,705,339 B2 | 3/2004 | Colton, Sr. |
| 6,708,952 B2 | 3/2004 | Brennecke et al. |
| 6,783,330 B2 | 8/2004 | Carnes et al. |
| 6,907,898 B2 | 6/2005 | White et al. |
| 7,334,600 B2 | 2/2008 | Scott |
| 7,481,238 B2 | 1/2009 | Ramoth |
| 7,617,838 B2 | 11/2009 | Katzman et al. |
| 9,200,718 B2 | 12/2015 | Cardia |
| 2002/0074037 A1 | 6/2002 | Enge |
| 2005/0161085 A1 | 7/2005 | Haunhorst et al. |
| 2006/0086388 A1 | 4/2006 | Fye |
| 2006/0266415 A1 | 11/2006 | Ganachaud et al. |
| 2007/0227593 A1 | 10/2007 | Belford et al. |
| 2010/0108156 A1 | 5/2010 | Katzman |
| 2011/0147016 A1 | 6/2011 | Blease et al. |
| 2013/0009415 A1 | 1/2013 | Goodman et al. |

OTHER PUBLICATIONS

Cardia, Sean A.; Non-Final Office Action for U.S. Appl. No. 13/752,414, filed Jan. 29, 2013, mailed Oct. 22, 2014, 13 pgs.

Cardia, Sean A.; Notice of Allowance for U.S. Appl. No. 13/752,414, filed Jan. 29, 2013, mailed Aug. 4, 2015, 7 pgs.

VAL-MATIC; Technical Data Sheet—Theory, Application and Sizing of Air Valves, dated Jan. 9, 1980; 7 pgs.

Cardia, Sean A.; U.S. Patent Application entitled: Air Valve Seat, having U.S. Appl. No. 13/752,414, filed Jan. 29, 2013, 26 pgs.

Cardia, Sean A.; Issue Notification for U.S. Appl. No. 13/752,414, filed Jan. 29, 2013, mailed Nov. 11, 2015, 1 pg.

Cardia, Sean A.; Non-Final Office Action for U.S. Appl. No. 15/070,902, filed Mar. 15, 2016, mailed Aug. 26, 2016, 24 pgs.

AIR VALVE SEAT

CROSS-REFERENCE TO RELATED APPLICATION

This application is a continuation of application Ser. No. 13/752,414, filed Jan. 29, 2013, which is hereby specifically incorporated by reference herein in its entirety.

TECHNICAL FIELD

This disclosure relates to valves. More specifically, this disclosure relates to air valves.

BACKGROUND

It is occasionally desirable to remove air from the interior of a fluid system to the exterior of the fluid system through an air valve. In many cases, it is also desirable that air from the exterior of the fluid system be prevented from entering the fluid system through the same air valve when air is not being removed from the interior of the fluid system through the air valve. When air is being removed from the fluid system, the air valve is open, and when air is not being removed from the fluid system, the air valve is closed.

SUMMARY

Disclosed is an air valve including a valve body having an inner surface and an outer surface, the inner surface and the outer surface defining an inlet and an outlet; a seat mounted within the valve body and having an upper surface and a lower surface, the upper surface facing the outlet of the valve body, the upper surface and the lower surface defining a bore and a fastener hole, the bore and the fastener hole extending between the upper surface and the lower surface, the upper surface further defining a first sealing ridge and a second sealing ridge, a second sealing ridge, the first sealing ridge and the second sealing ridge extending between the bore and the fastener hole; a fastener extending through the fastener hole into the valve body; and a float moveable within the valve body and engageable with the bore of the seat.

Also disclosed is an air valve seat including an upper surface, the upper surface defining a first sealing ridge and a second sealing ridge; a lower surface; a fastener hole extending from the upper surface to the lower surface; and a bore extending from the upper surface to the lower surface, the first sealing ridge and the second sealing ridge extending around the bore and inward of the fastener hole.

Also disclosed is a method for venting air from a fluid system through an air valve including moving a float away from a seat mounted within a valve body, the valve body having an inner surface and an outer surface, the inner surface and the outer surface defining an inlet and an outlet, the seat having an upper surface and a lower surface defining a bore and a fastener hole extending between the upper surface and the lower surface, the upper surface facing the outlet of the valve body and defining a first sealing ridge and a second sealing ridge between the bore and the fastener hole, a fastener extending through the fastener hole into the valve body; and venting air from the fluid system through the outlet.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is an air valve and associated methods, systems, devices, and various apparatus. The air valve includes a valve body, a seat mounted within the valve body and having an upper surface defining a first sealing ridge and a second sealing ridge, and a float moveable within the valve body and engageable with a bore of the seat. It would be understood by one of skill in the art that the disclosed air valve is described in but a few exemplary embodiments among many. No particular terminology or description should be considered limiting on the disclosure or the scope of any claims issuing therefrom.

Figure 1:
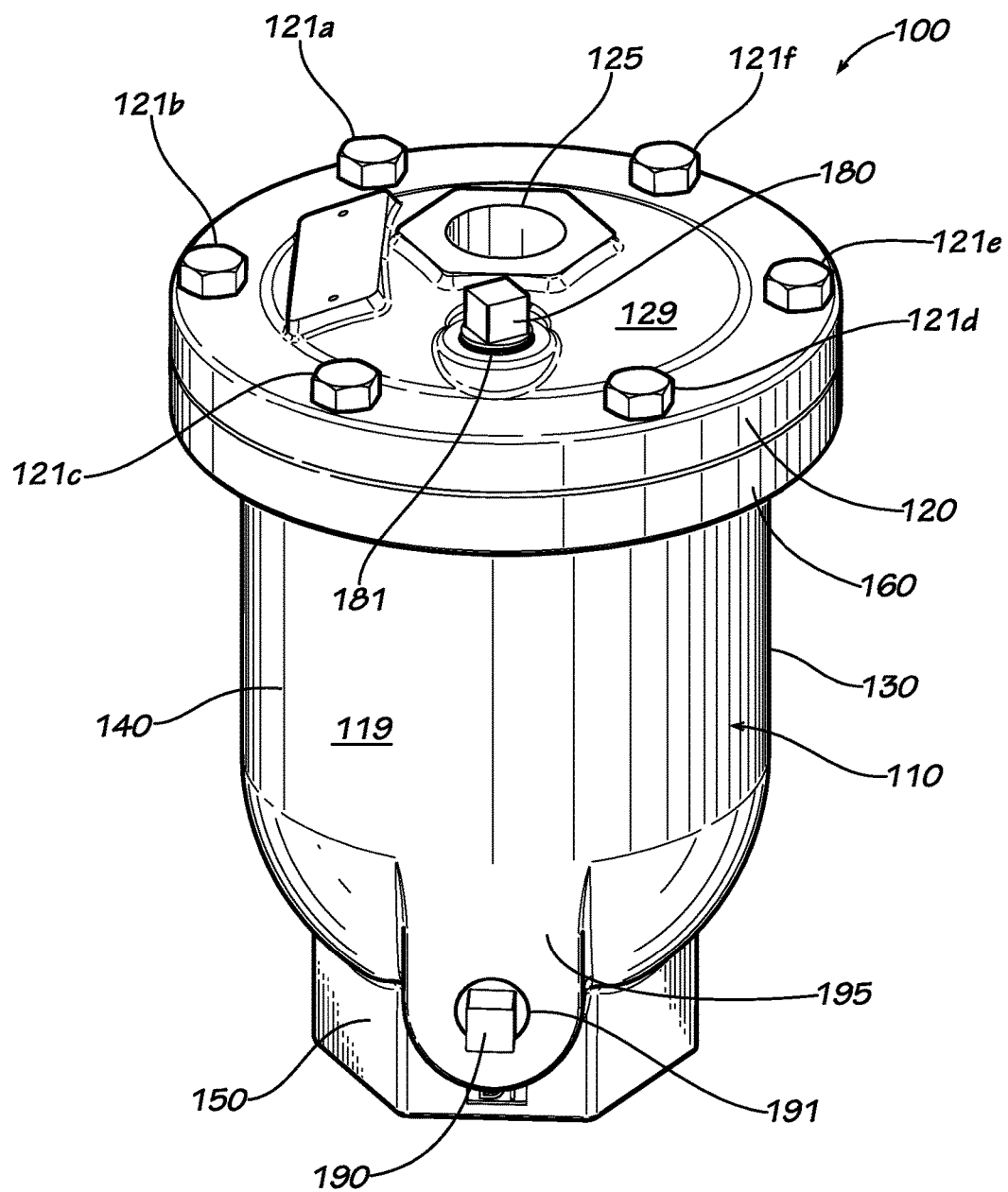
FIG. 1 is a perspective view of an air valve in accord with one embodiment of the current disclosure.

One embodiment of an air valve 100 is disclosed and described in FIG. 1. In the current embodiment, the air valve 100 is an air/vacuum valve, though other air valves 100 would be understood by one of skill in the art to be included as various embodiments of this disclosure. The air valve 100 includes a valve body 110 that has an 117 (shown in FIG. 2) and an outer surface 119. The valve body 110 also includes a cover 120 and an enclosure 130. In the current embodiment, the cover 120 includes a cover outer surface 129 and a cover inner surface 127 (shown in FIG. 2). The cover 120 defines an outlet 125 and the enclosure 130 defines an inlet 135 (shown in FIG. 2). The enclosure 130 includes a body cavity portion 140, an inlet portion 150, and a flange 160. The body cavity portion 140 is cylindrical, though the shape of the body cavity portion 140 should not be considered limiting. The cover 120 is fastened to the enclosure 130 by a plurality of fasteners 121a,b,c,d,e,f in the form of a plurality of nuts and bolts. Though six fasteners 121a,b,c,d,e,f are shown in the current embodiment, any number of fasteners may be used in alternative embodiments. Various types of fasteners, such as nails, screws, welding, or any other type of fastener may be used, and the disclosure of nuts and bolts is not limiting upon the fastener that is used. The air valve 100 also includes an upper plug 180 extending through an upper plug bore 181 defined in the cover 120. The air valve 100 also includes a lower plug 190 extending through a lower plug bore 191 defined in a plug protrusion 195 extending from the enclosure 130. The components of the valve body 110, in the current embodiment, are not meant to be limiting. Additional components may be added to the valve body 110 and the components in combination described above are not all required.

Figure 2:
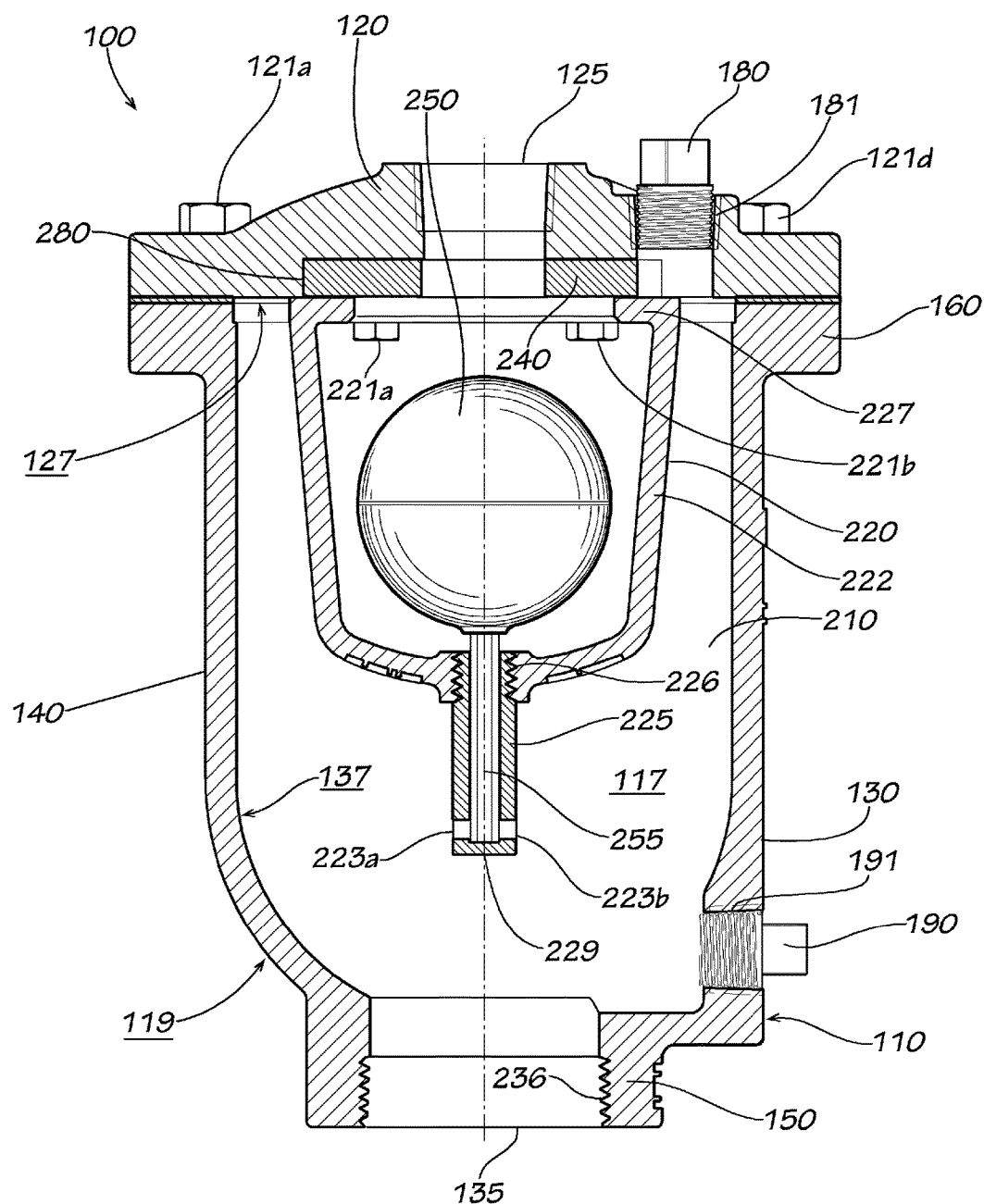
FIG. 2 is a cross-sectional view of the air valve of FIG. 1.

FIG. 2 shows a cross-sectional view of the air valve 100. As can be seen in FIG. 2, the inner surface 117 defines a body cavity 210. The inner surface 117 includes the cover inner surface 127 and an enclosure inner surface 137. The cover inner surface 127 and the cover outer surface 129 define outlet 125 in the cover 120, and enclosure inner surface 137 and outer surface 119 define outlet 125. The outlet 125 includes a threaded portion 236 for installation of the air valve 100 on a fluid system 600 (shown in FIG. 6).

FIG. 2 also shows a baffle 220 mounted to the cover 120 by a plurality of baffle fasteners 221a,b,c,d (221c,d not shown). The presence and location of the baffle 220 should not be considered limiting, and the baffle 220 may be mounted to the valve body 110 by any method, including welding, gluing, or fastening, or may be formed integrally with the cover 120 or the enclosure 130. The baffle 220 includes baffle arms 222 and a guide bushing 225. The guide bushing 225 is attached to the baffle arms 222 by a threaded bore 226, though the guide bushing 225 may be attached to the baffle arms 222 by any other method in other embodiments, such as welding, gluing, or fastening, or may be formed integrally with the baffle arms 222. The baffle arms 222 are spaced to allow fluid communication between the inlet 135 and the outlet 125. A float 250 is mounted on the baffle 220 between the baffle arms 222. In the current embodiment, the float 250 is ball-shaped, though the shape of the float 250 or the location of the float 250 within the valve body 110 should not be considered limiting, and the float 250 may have flat or rounded surfaces or a combination of the two and may be capsule-shaped, truncated, cylindrical, or any other shape. A guide shaft 255 extends from a bottom end of the float 250 into the guide bushing 225. The float 250 is moveable within the valve body 110 and along an axis extending through the guide shaft 255. The guide shaft 255 may slide upwards and downwards within the guide bushing 225 as the float 250 moves upwards and downwards by buoyancy. Sliding the guide shaft 255 downwards within the guide bushing 225 contacts the guide shaft 255 with a guide shaft stop 229 of the guide bushing 225. The guide bushing 225 also includes a pair of guide bushing vents 223a,b to allow fluid to enter and exit the guide bushing 225 during movement of the guide shaft 255.

The float 250 is stoppable against a seat 240 mounted between the float 250 and the cover 120. The seat is mounted to a cover recess 280 of the cover 120 by the plurality of baffle fasteners 221a,b,c,d. The baffle fasteners 221a,b,c,d extend through a baffle rim 227 of the baffle 220, through the seat 240, and into the cover 120. Though four baffle fasteners 221a,b,c,d are present in the current embodiment, any number of fasteners may be used in alternative embodiments. Various types of fasteners, such as nails, screws, welding, or any other type of fastener may be used, and the disclosure of nuts is not limiting upon the fastener that is used.

Figure 3:
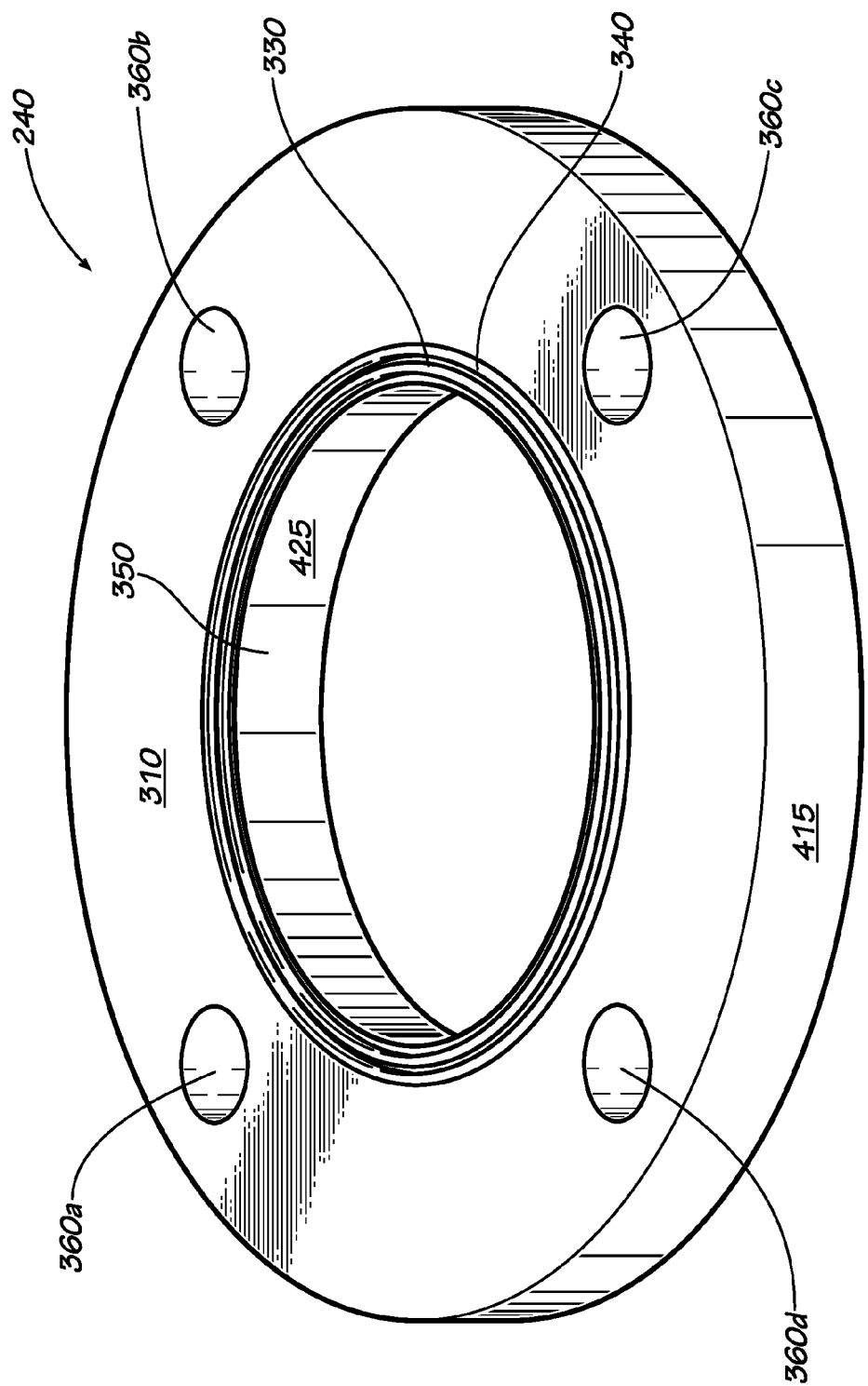
FIG. 3 is a perspective view of a valve seat of the air valve of FIG. 1.

FIG. 3 shows the seat 240. The seat 240 includes a seat upper surface 310 and a seat lower surface 320 (shown in FIG. 5A). In the current embodiment, the seat upper surface 310 faces the outlet 125 (shown in FIG. 2) when mounted within the valve body 110. Defined on the seat upper surface 310 is a first sealing ridge 330 and a second sealing ridge 340. In the current embodiment, the first sealing ridge 330 and the second sealing ridge 340 are not visible in FIG. 2 because tightening pressure between the baffle 220 and the cover 120 caused by the baffle fasteners 221a,b,c,d flattens the first sealing ridge 330 and the second sealing ridge 340 by deformation, though the first sealing ridge 330 and the second sealing ridge 340 may not be flattened in some other embodiments. In the current embodiment, the first sealing ridge 330 and the second sealing ridge 340 are circular and concentric such that the first sealing ridge 330 is positioned within the second sealing ridge 340, though the shape and relationship of the first sealing ridge 330 and the second sealing ridge 340 should not be considered limiting. The seat upper surface 310 and the seat lower surface 320 also define a seat bore 350 and a plurality of seat fastener holes 360a,b,c,d. Each baffle fastener 221a,b,c,d extends through a respective seat fastener hole 360a,b,c,d.

Figure 4:
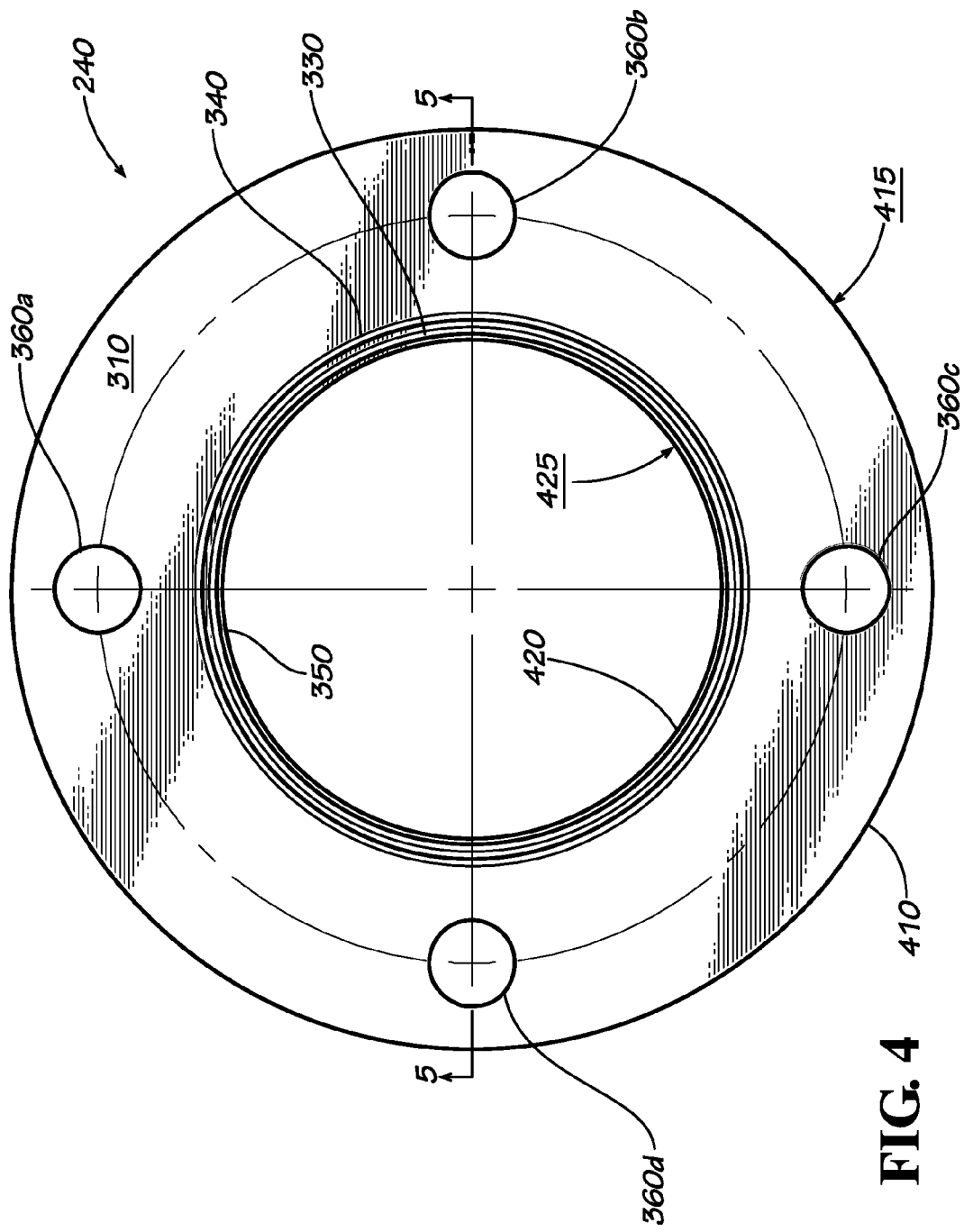
FIG. 4 is a top view of the valve seat of FIG. 3.

FIG. 4 shows a top view of the seat 240. As shown in FIG. 4, the seat 240 is ring-shaped and has a circular profile, including an outer edge 410 having an outer edge surface 415 and an inner edge 420 having an inner edge surface 425. The inner edge 420 is defined within the seat bore 350, which also has a circular profile, the inner edge surface 425 defining a cylindrical shape. The circular profile of the seat bore 350 is concentric with the first sealing ridge 330 and the second sealing ridge 340 in the current embodiment. However, the shape of the seat 240 and the seat bore 350, as well as the relationship of the seat bore 350 with the first sealing ridge 330 and the second sealing ridge 340, should not be considered limiting.

FIG. 4 also shows the positions of the seat fastener holes 360a,b,c,d on the seat 240. Each seat fastener hole 360a,b,c,d is placed at 90 degree intervals with respect to each other between the outer edge 410 of the seat 240 and the second sealing ridge 340. However, neither the presence of nor the location, size, or number of the seat fastener holes 360a,b,c,d should be considered limiting, and the seat fastener holes 360a,b,c,d may be placed at any location on the seat 240.

Figure 5A:
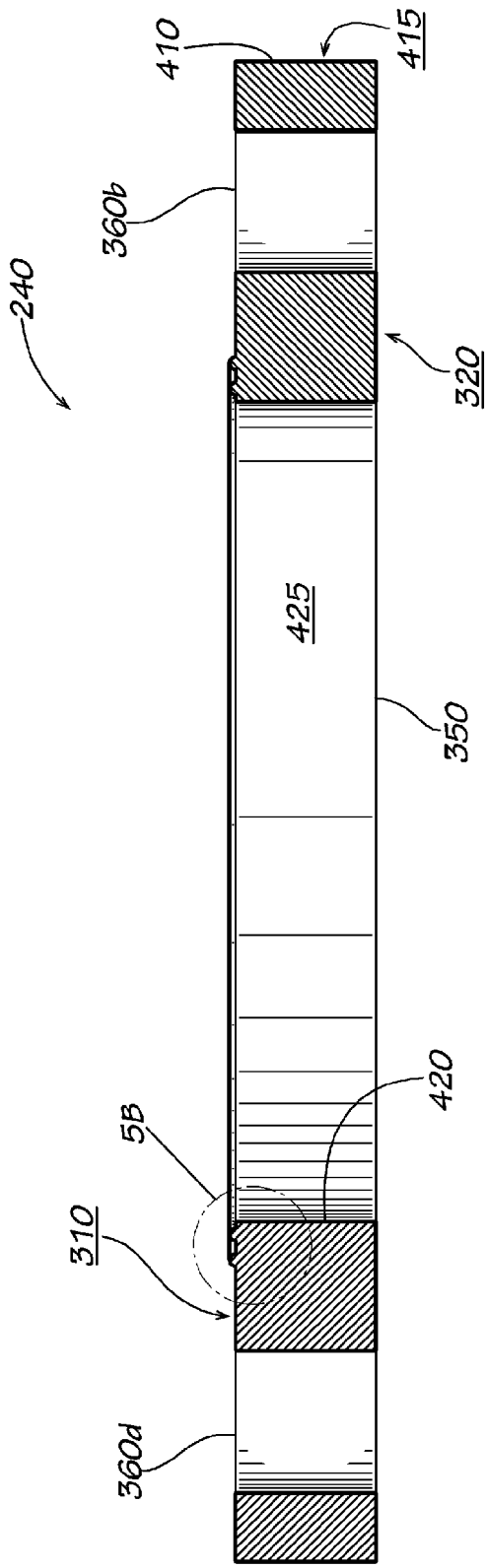
FIG. 5A is a cross-sectional view of the valve seat of FIG. 4 taken along line 5-5.

FIG. 5A shows a cross-sectional view of the seat 240 taken along line 5-5 in FIG. 4. FIG. 5A shows that the seat fastener holes 360a,b,c,d extend through the seat 240 from the seat upper surface 310 to the seat lower surface 320. Further, FIG. 5A shows that seat lower surface 320 is flat in the current embodiment, though the shape of the seat lower surface 320 should not be considered limiting.

Figure 5B:
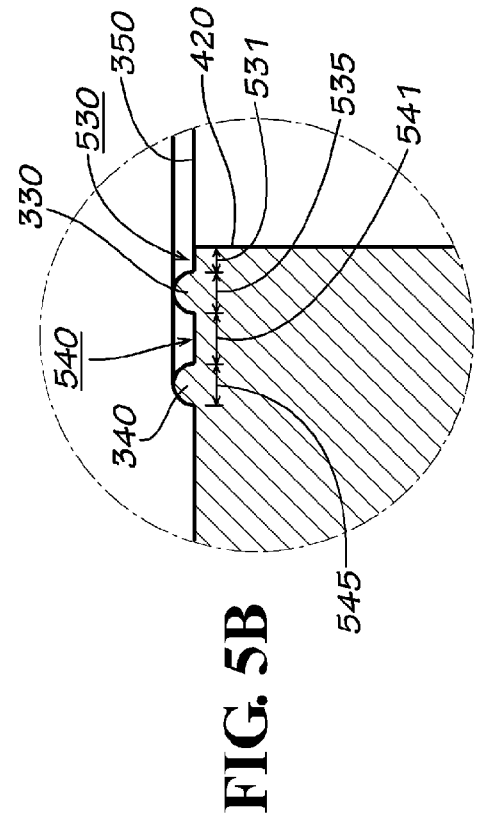
FIG. 5B is a detail view of a section of the valve seat shown in FIG. 5A.

FIG. 5B shows a detail view of the seat 240 shown in FIG. 5A. FIG. 5B shows the cross-sectional profile of the first sealing ridge 330 and the second sealing ridge 340. The first sealing ridge 330 and the second sealing ridge 340 have semi-circular profiles, though the shape of the profiles of the first sealing ridge 330 and the second sealing ridge 340 may be different in other embodiments. Between the first sealing ridge 330 and the seat bore 350 is a first transition surface 530. In the current embodiment, a first radial distance 531 that the first transition surface 530 extends from the inner edge 420 to the first sealing ridge 330 is less than a first diameter 535 of the first sealing ridge 330. The first radial distance 531 may be equal to, larger, or smaller than the first diameter 535 in other embodiments. Between the first sealing ridge 330 and the second sealing ridge 340 is a second transition surface 540. In the current embodiment, a second radial distance 541 that the second transition surface 540 extends from the first sealing ridge 330 to the second sealing ridge 340 is less than the first diameter 535 of the first sealing ridge 330. The second radial distance 541 may be larger or smaller than the first diameter 535 in other embodiments. The second sealing ridge 340 has a second diameter 545 in the current embodiment that is approximately equal to the first diameter 535 of the first sealing ridge 330, though the second diameter 545 may be larger or smaller than the first diameter 535 in other embodiments. In other embodiments, the first sealing ridge 330 may be directly adjacent to the seat bore 350 or the second sealing ridge 340 may be directly adjacent to the first sealing ridge 330. The disclosure of first transition surface 530 and second transition surface 540 should not be considered limiting.

Figure 6A:
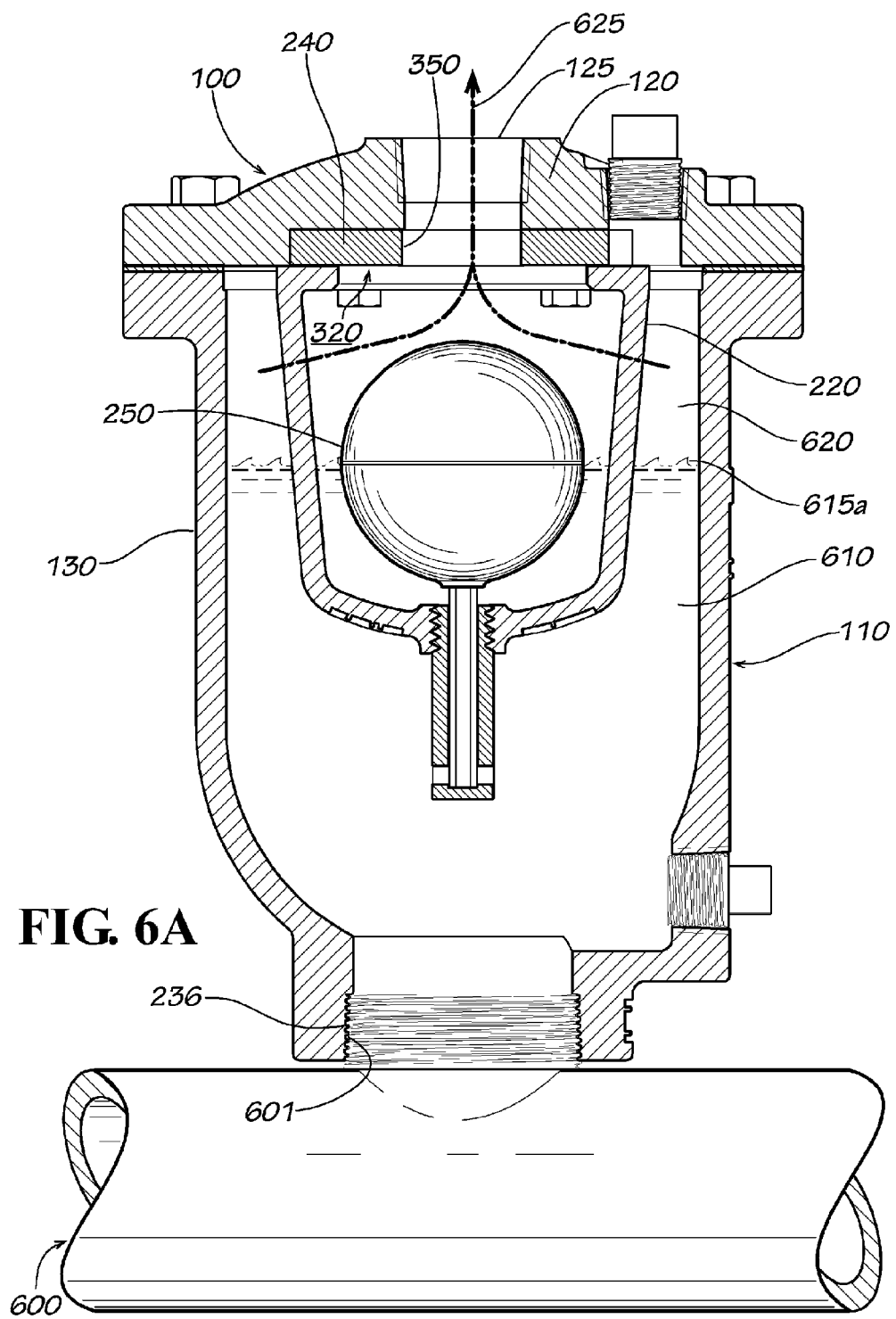
FIGS. 6A and 6B show a cross-sectional view of the air valve of FIG. 1 mounted on a fluid system and a method of removing air from the fluid system.
Figure 6B:
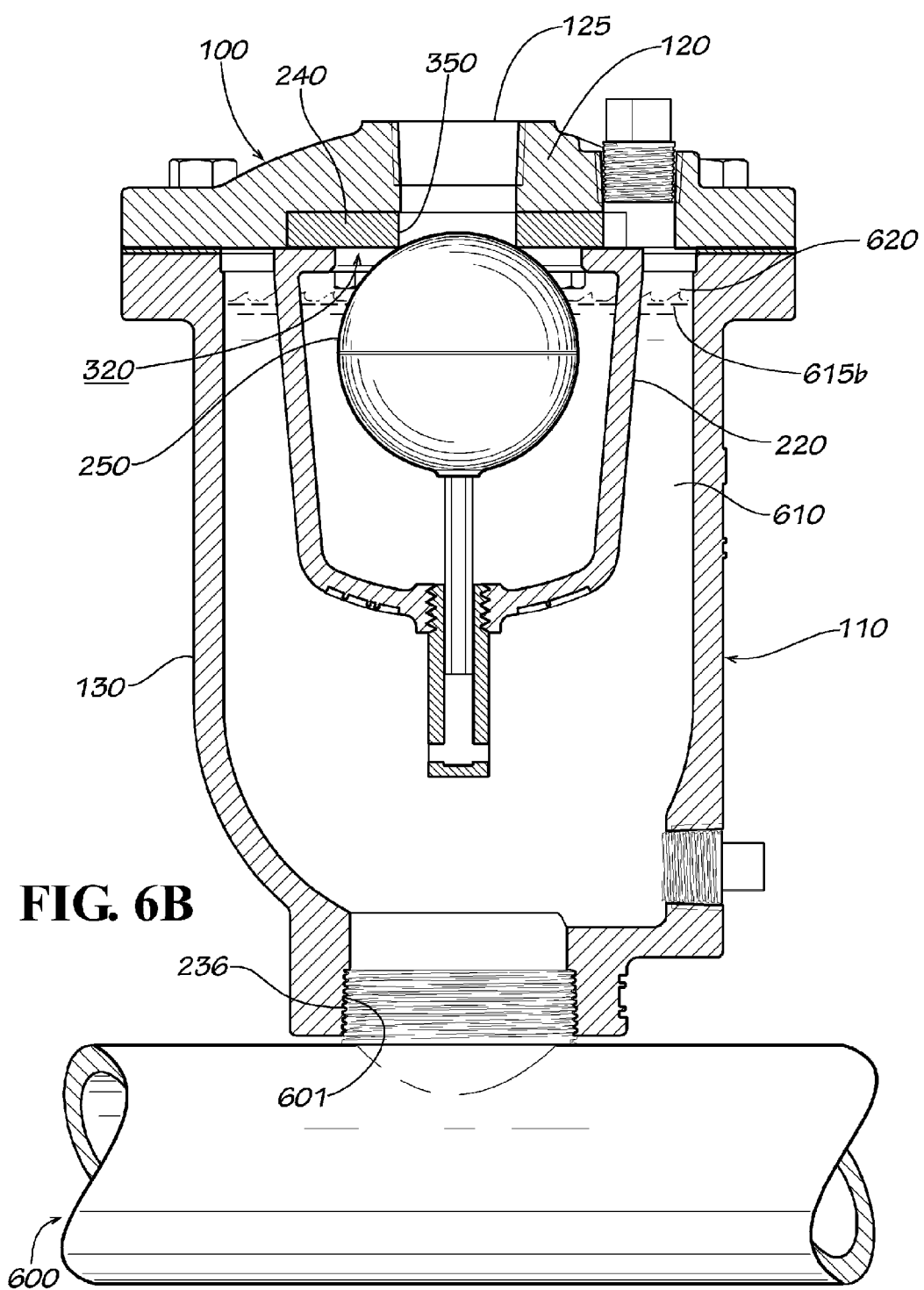

FIGS. 6A and 6B show a venting process for the air valve 100. FIG. 6A shows the air valve 100 mounted on the fluid system 600. In the current embodiment, the fluid system 600 is a pipe system, though the fluid system 600 may be any other system where fluid is present in other embodiments. In the current embodiment, the air valve 100 is mounted on a high point of the fluid system 600 to allow air to travel upward by buoyancy in the fluid system 600 to the air valve 100, although the air valve 100 may be mounted at any point of the fluid system 600 where air may accumulate. The threaded portion 236 of the valve body 110 engages a threaded system outlet 601 to mount the air valve 100 on the fluid system 600. The fluid system 600 contains a fluid 610 and an air 620. The type of fluid 610 should not be considered limiting, and may include drinking water, wastewater, industrial fluids and chemicals, fuel, or drinkable liquids, and may include particulates or other solids or gases suspended or mixed with the fluid 610. When the fluid 610 is at or around a fluid level 615a, air 620 has accumulated in the fluid system 600 such that the float 250 is positioned away from the seat 240, uncovering the outlet 125. When the outlet 125 is uncovered, fluid pressure within the fluid system 600 forces air 620 out of the valve body 110 through the outlet 125, as indicated by the air flow lines 625, raising the fluid 610 within the valve body 110 to a fluid level 615b, shown in FIG. 6B, because the fluid pressure within the fluid system 600 is greater than atmospheric pressure outside the fluid system 600. When the fluid 610 is at or above fluid level 615b, the float 250 covers and engages the seat bore 350, covering and sealing the outlet 125. When the float 250 covers the outlet 125, air 620 ceases to leave the valve body 110 because the ball-shaped float 250 has a diameter larger than a diameter of the circular profile of the seat bore 350. This venting process is repeated as more air 620 enters the fluid system 600 and accumulates in the air valve 100 to move the fluid 610 below fluid level 615b, moving the float 250 away from the outlet 125.

As can be seen in FIGS. 6A and 6B, in the current embodiment, the seat bore 350 approximates the profile of the outlet 125. When mounted between the baffle 220 and the cover 120, the seat 240 provides a seal around the outlet 125 to prevent air 620 or fluid 610 from escaping except through the seat bore 350 when the float 250 is positioned away from the seat 240. The first sealing ridge 330 and the second sealing ridge 340 contact and press against the inner surface 117 of the valve body 110 at the cover 120 within the cover recess 280, providing multiple levels of sealing to prevent fluid 610 and air 620 from escaping the fluid system 600 around the seat 240. The first sealing ridge 330 and the second sealing ridge 340, even if flattened as in the current embodiment, also prevent air from entering the air valve 100 around the seat 240 instead of through the seat bore 350. In addition, in the current embodiment, the seat lower surface 320 also provides a flat mounting surface to mount the baffle 220 to the cover 120.

Figure 7:
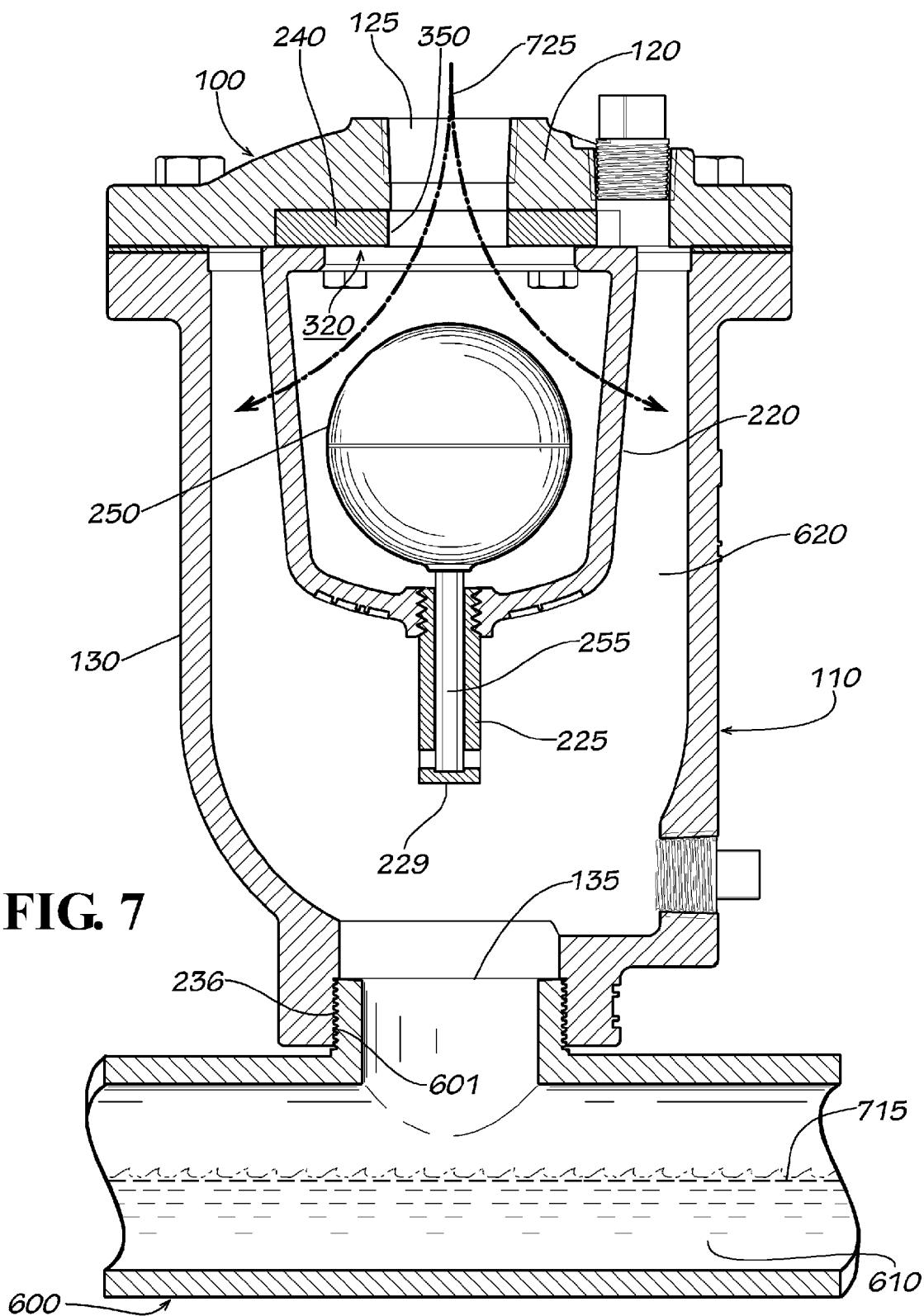
FIG. 7 shows a method of draining the fluid system of FIGS. 6A and 6B.

FIG. 7 shows a draining process involving the air valve 100. During draining of the fluid system 600, it may be necessary to allow air to enter the fluid system 600 to prevent a vacuum condition. When the fluid in the fluid system 600 lowers towards a fluid level 715 below the air valve 100, the float 250 moves away from the outlet 125. In the current embodiment, fluid pressure is lowered within the fluid system 600 so that air 620 from outside the fluid system 600 is pulled into the outlet 125, through the air valve 100, to the inlet 135 to enter the fluid system 600, as indicated by the air flow lines 725. During the draining process, when the fluid in the air valve 100 moves below the fluid level 615a shown in FIG. 6A, the guide shaft 255 moves downward within the guide bushing 225 and contacts the guide shaft stop 229, preventing further downward movement of the guide shaft 255 and, subsequently, the float 250. Therefore the float 250 is positioned away from the outlet 125 but cannot continue to move downward to block the inlet 135.

In the current embodiment, the seat 240 is made of rubber, but the seat 240 may be made of any material, such as plastic or stainless steel, and the disclosure of rubber should not be considered limiting. In the current embodiment, the float 250 is made of stainless steel and is formed of two halves welded together to form a hollow interior that allows the stainless steel float 250 to float in a fluid 610, but the float 250 may be made of any material, such as plastic or rubber, and the disclosure of stainless steel should not be considered limiting. The seat 240 and the float 250 may be formed from the same material or different materials in other embodiments. Further, the seat 240 and the float 250 may be formed of a solid piece or may comprise multiple parts or a hollow shell.

Figure 8:
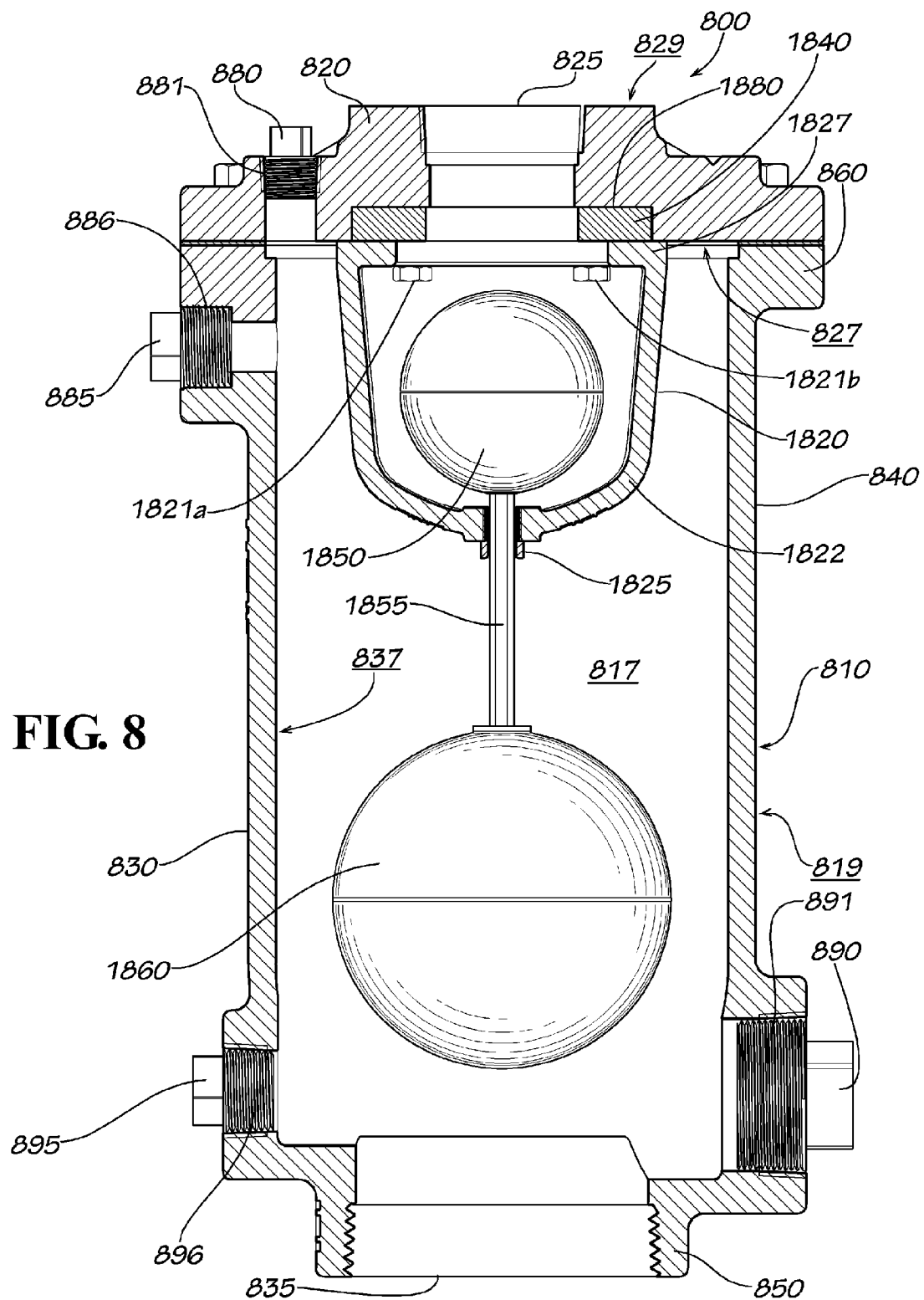
FIG. 8 shows a cross-sectional view of an air valve in accord with one embodiment of the current disclosure.

FIG. 8 shows a cross-sectional view of an alternative embodiment of an air/vacuum valve in the form of air valve 800. The air valve 800 has a valve body 810 including an inner surface 817, an outer surface 819, an enclosure 830, and a cover 820, the cover 820 including a cover inner surface 827 and a cover outer surface 829, the enclosure 830 including an enclosure inner surface 837. The inner surface 817 includes the cover inner surface 827 and an enclosure inner surface 837. The cover 820 defines an outlet 825 and the enclosure 830 defines an inlet 835. The enclosure 830 includes a body cavity portion 840, an inlet portion 850, and a flange 860. Similar to air valve 100, the shape of the body cavity portion 840 is cylindrical in the current embodiment. The air valve 800 also includes a first upper plug 880 extending through a first upper plug bore 881 defined in the cover 820 and a second upper plug 885 extending through a second upper plug bore 886 defined in the flange 860 of the enclosure 830. The air valve also includes a first lower plug 890 extending through a first lower plug bore 891 defined in the enclosure 830 and a second lower plug 895 extending through a second low plug bore 896 defined in the enclosure 830.

FIG. 8 also shows a baffle 1820 mounted to the cover 820 by a plurality of baffle fasteners 1821a,b,c,d (1821c,d not shown). The baffle 1820 includes baffle arms 1822 and a guide bushing 1825. The baffle arms 1822 are spaced to allow fluid communication between the inlet 835 and the outlet 825. An upper float 1850 is mounted between the baffle arms 1822. A guide shaft 1855 extends from a bottom end of the upper float 1850 through the guide bushing 1825 to a lower float 1860. In the current embodiment, the upper float 1850 and the lower float 1860 are ball-shaped, though the shape of the upper float 1850 and the lower float 1860 should not be considered limiting. The upper float 1850 and lower float 1860 are moveable along an axis extending through the guide shaft 1855. The guide shaft 1855 may slide upwards and downwards within the guide bushing 1825 as the upper float 1850 and lower float 1860 move upwards and downwards by buoyancy. Sliding the guide shaft 1855 downwards within the guide bushing 1825 cause contacts between the upper float 1850 and the baffle arms 1822 such that the baffle arms 1822 provide a stop to prevent further downward movement of the upper float 1850 and the lower float 1860.

The upper float 1850 is stoppable against a seat 1840 mounted between the upper float 1850 and the cover 820. The seat is mounted to a cover recess 1880 of the cover 820 by the plurality of baffle fasteners 1821a,b,c,d. The baffle fasteners 1821a,b,c,d extend through a baffle rim 1827 of the baffle 1820, through the seat 1840, and into the cover 820. Though four baffle fasteners 1821a,b,c,d are present in the current embodiment, any number of fasteners may be used in alternative embodiments. Various types of fasteners, such as nails, screws, welding, or any other type of fastener may be used, and the disclosure of nuts is not limiting upon the fastener that is used. The seat 1840 is similar in shape to the seat 240 of the air valve 100, though the seat 1840 is sized as necessary to the size of the outlet 825 and the cover recess 1880, and the measurements of features of the seat 1840 or the seat 240 should not be considered limiting.

The relationship between the upper float 1850 and the seat 1840, and their use in venting air from a fluid system 600, is similar to the relationship of the float 250 and the seat 240 of the air valve 100. The presence and position of the lower float 1860 allows for a lower fluid level within the air valve 800 before the upper float 1850 moves away from the seat 1840, allowing more air to accumulate within the air valve 800 before the venting process begins. A lower fluid level within the air valve 800 may provide the benefit of keeping fluid from contacting the upper float 1850. For example, when the fluid system 600 is a wastewater system, it may be desired to prevent buildup of waste or solids on the upper float 1850 to prevent interference between the upper float 1850 and the seat 1840 or corrosion of the upper float 1850. The size and shape of the upper float 1850 and the lower float 1860, in general and relative to each other, should not be considered limiting.

Figure 9:
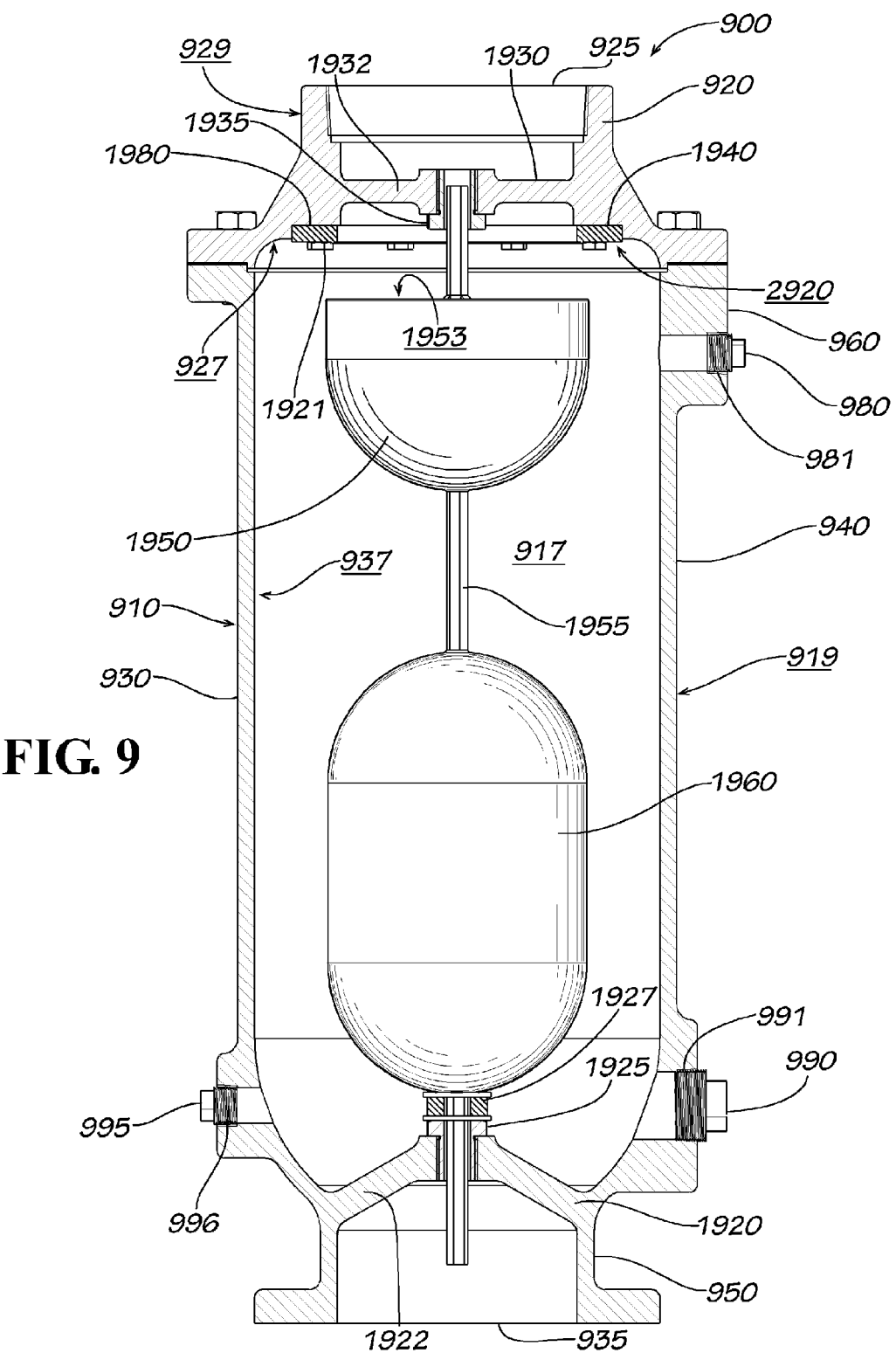
FIG. 9 shows a cross-sectional view of an air valve in accord with one embodiment of the current disclosure.

FIG. 9 shows a cross-sectional view of a second alternative embodiment of an air/vacuum valve in the form of air valve 900. The air valve 900 has a valve body 910 including an inner surface 917, an outer surface 919, an enclosure 930, and a cover 920, the cover 920 including a cover inner surface 927 and a cover outer surface 929, the enclosure 930 including an enclosure inner surface 937. The inner surface 917 includes the cover inner surface 927 and an enclosure inner surface 937. The cover 920 defines an outlet 925 and the enclosure 930 defines an inlet 935. The enclosure 930 includes a body cavity portion 940, an inlet portion 950, and a flange 960. Similar to air valve 100 and air valve 800, the shape of the body cavity portion 940 is cylindrical in the current embodiment. The air valve 900 also includes an upper plug 980 extending through a second upper plug bore 981 defined in the flange 960 of the enclosure 930. The air valve 900 also includes a first lower plug 990 extending through a first lower plug bore 991 defined in the enclosure 930 and a second lower plug 995 extending through a second low plug bore 996 defined in the enclosure 930.

FIG. 9 also shows that the air valve 900 includes a lower guide shaft mount 1920 mounted to the inlet portion 950 of the enclosure 930 and an upper guide shaft mount 1930 mounted to the cover 920. The lower guide shaft mount 1920 includes lower mount arms 1922, a lower guide bushing 1925, and a cushion bumper 1927. The upper guide shaft mount 1930 includes upper mount arms 1932 and an upper guide bushing 1935. The lower mount arms 1922 are spaced with respect to each other to allow fluid communication between the inlet 935 and the outlet 925, and the upper mount arms 1932 are also spaced with respect to each other to allow fluid communication between the inlet 935 and the outlet 925. A guide shaft 1955 extends through and between the upper guide bushing 1935 and the lower guide bushing 1925. In the current embodiment, an upper float 1950 and a lower float 1960 are mounted on the guide shaft 1955 between the upper guide bushing 1935 and the lower guide bushing 1925. The lower float 1960 has a cylindrical middle section and rounded ends, making the lower float 1960 capsule-shaped, and the upper float 1950 has a cylindrical upper section with a flat top surface 1953 and a rounded lower section, giving the upper float 1950 the shape of a truncated capsule, though the shape of the upper float 1950 and the lower float 1960 should not be considered limiting. The upper float 1950 and lower float 1960 are moveable along an axis extending through the guide shaft 1955. The guide shaft 1955 may slide upwards and downwards within the upper guide bushing 1935 and the lower guide bushing 1925 as the upper float 1850 and lower float 1860 move upwards and downwards by buoyancy. Sliding the guide shaft 1955 downwards causes contact between the lower float 1960 and the cushion bumper 1927 such that the cushion bumper 1927 provides a stop to prevent further downward movement of the upper float 1950 and the lower float 1960.

The upper float 1950 is stoppable against a seat 1940 mounted between the upper float 1950 and the cover 920. The seat 1940 is mounted to a cover recess 1980 of the cover 920 by the plurality of seat fasteners 1921. The seat fasteners 1921 extend through the seat 1940 and into the cover 920. Any number of fasteners may be used in alternative embodiments. Various types of fasteners, such as nails, screws, welding, or any other type of fastener may be used, and the disclosure of nuts is not limiting upon the fastener that is used. The seat 1940 is similar in shape to the seat 240 of the air valve 100 and the seat 1840 of the air valve 800, though the seat 1940 is sized as necessary to the size of the outlet 925 and the cover recess 1980, and the measurements of features of the seat 1940. In addition, the seat 1940 may have any number of seat fastener holes to correspond to the number of seat fasteners 1921.

The relationship between the upper float 1950 and the seat 1940, and their use in venting air from a fluid system 600, is similar to the relationship of the float 250 and the seat 240 of the air valve 100. In the current embodiment, the flat top surface 1953 of the upper float 1950 engages a flat seat lower surface 2920 to seal the outlet 925 and prevent air from venting through the air valve 900. The seat lower surface 2920 is similar to the seat lower surface 320 of the seat 240. In addition, the shape of the upper float 1950 may also affect the speed at which the upper float 1950 rises and falls compared to the ball-shaped upper float 1850 or the float 250. The presence and position of the lower float 1960 allows for a lower fluid level within the air valve 900 before the upper float 1950 moves away from the seat 1940, allowing more air to accumulate within the air valve 900 before the venting process begins. The size and shape of the upper float 1950 and the lower float 1960, in general and relative to each other, should not be considered limiting.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An air valve comprising:
    a valve body having an inner surface and an outer surface, the inner surface and the outer surface defining an inlet and an outlet;
    a seat mounted within the valve body and having an upper surface and a lower surface, the upper surface facing the outlet of the valve body and contacting the valve body, the upper surface and the lower surface defining a bore and a fastener hole, the bore and the fastener hole extending between the upper surface and the lower surface, the upper surface further defining a first sealing ridge and a second sealing ridge, a portion of the upper surface defining a transition surface extending between the first sealing ridge and the second sealing ridge, the first sealing ridge and the second sealing ridge extending between the bore and the fastener hole;
    a fastener extending through the fastener hole into the valve body; and
    a float moveable within the valve body and engageable with the bore of the seat.

2. The air valve of claim 1, wherein the lower surface of the seat is flat and the upper surface of the seat is flat except for the first sealing ridge and the second sealing ridge.

3. The air valve of claim 1, wherein:
    the bore has an inner edge;
    the first sealing ridge has an innermost point and a thickness diameter; and
    the innermost point is spaced from the inner edge by a distance that is less than the thickness diameter.

4. The air valve of claim 1, wherein the first sealing ridge has an outermost point, and the outermost point is separated from the second sealing ridge by a transition surface.

5. The air valve of claim 4, wherein the transition surface defines a distance that is less than a thickness diameter of the first sealing ridge.

6. The air valve of claim 1, wherein the first sealing ridge and the second sealing ridge are circular.

7. The air valve of claim 6, wherein the first sealing ridge and the second sealing ridge are concentric.

8. The air valve of claim 1, wherein the first sealing ridge and the second sealing ridge contact a cover of the valve body.

9. The air valve of claim 8, wherein the fastener extends through the fastener hole into the cover.

10. The air valve of claim 9, wherein the first sealing ridge and the second sealing ridge assume a deformed shape upon tightening of the fastener.

11. An air valve seat comprising:
    an upper surface configured to contact a valve body, the upper surface defining a first sealing ridge and a second sealing ridge, a portion of the upper surface defining a transition surface extending between the first sealing ridge and the second sealing ridge;
    a lower surface;
    a fastener hole extending from the upper surface to the lower surface; and
    a bore extending from the upper surface to the lower surface, the first sealing ridge and the second sealing ridge extending around the bore and inward of the fastener hole.

12. The air valve seat of claim 11, wherein the lower surface is flat and the upper surface of the seat is flat except for the first sealing ridge and the second sealing ridge.

13. The air valve of claim 11, wherein:
    the bore has an inner edge;
    the first sealing ridge has an innermost point and a thickness diameter; and
    the innermost point is spaced from the inner edge by a distance that is less than the thickness diameter.

14. The air valve of claim 11, wherein the first sealing ridge has an outermost point, and the outermost point is separated from the second sealing ridge by a transition surface.

15. The air valve of claim 14, wherein the transition surface defines a distance that is less than a thickness diameter of the first sealing ridge.

* * * * *